(12) United States Patent
Karani

(10) Patent No.: US 9,920,842 B1
(45) Date of Patent: Mar. 20, 2018

(54) LOW-TORQUE CHOKE VALVE FOR WELL AUTOMATION

(71) Applicant: Hans Karani, Houston, TX (US)

(72) Inventor: Hans Karani, Houston, TX (US)

( * ) Notice: Subject to any disclaimer, the term of this patent is extended or adjusted under 35 U.S.C. 154(b) by 58 days.

(21) Appl. No.: 14/615,415

(22) Filed: Feb. 5, 2015

Related U.S. Application Data

(60) Provisional application No. 61/936,300, filed on Feb. 5, 2014.

(51) Int. Cl.
| | |
|---|---|
| *F16K 3/26* | (2006.01) |
| *F16K 3/314* | (2006.01) |
| *F16K 3/24* | (2006.01) |
| *F16K 37/00* | (2006.01) |

(52) U.S. Cl.
CPC .............. *F16K 3/314* (2013.01); *F16K 3/246* (2013.01); *F16K 37/0016* (2013.01); *F16K 3/26* (2013.01); *Y10T 137/8275* (2015.04); *Y10T 137/8292* (2015.04)

(58) Field of Classification Search
CPC ...... F16K 3/246; F16K 3/26; Y10T 137/8275; Y10T 137/86791; Y10T 137/8292
USPC .................................. 137/556, 556.3, 625.37
See application file for complete search history.

(56) References Cited

U.S. PATENT DOCUMENTS

| | | | | |
|---|---|---|---|---|
| 4,337,788 A * | 7/1982 | Seger ...................... | E21B 34/02 |
| | | | 137/315.02 |
| 4,540,022 A * | 9/1985 | Cove ....................... | E21B 34/02 |
| | | | 137/625.3 |
| 4,569,366 A * | 2/1986 | West .................... | F16K 37/0016 |
| | | | 116/277 |
| 4,569,370 A * | 2/1986 | Witt .......................... | F16K 3/26 |
| | | | 137/625.3 |
| 4,573,492 A * | 3/1986 | Tadokoro ................ | F16K 3/265 |
| | | | 137/239 |
| 4,732,364 A * | 3/1988 | Seger ...................... | E21B 34/02 |
| | | | 251/122 |
| 5,086,808 A * | 2/1992 | Pettus ..................... | E21B 34/02 |
| | | | 137/625.3 |
| 5,586,541 A * | 12/1996 | Tsai ..................... | F01M 13/023 |
| | | | 123/574 |
| 5,706,856 A | 1/1998 | Lancaster | |
| 6,283,152 B1 * | 9/2001 | Corte, Jr. ................ | F16K 1/443 |
| | | | 137/614.11 |

(Continued)

*Primary Examiner* — Michael R Reid
*Assistant Examiner* — Christopher Ballman
(74) *Attorney, Agent, or Firm* — Quickpatents, LLC; Kevin Prince

(57) ABSTRACT

A choke valve body of a valve apparatus includes a lower stem that terminating at a lower end thereof with a plug. A conduit traverses a lower portion of the lower stem between at least one plug aperture traversing the plug to at least one top aperture traversing an upper end of the lower portion. The lower portion is slidably retained within the valve chamber between closed and open positions. A bonnet fixed with the valve body has a bonnet chamber for receiving the lower portion, and a bore with at least one annular seal for slidably retaining an upper portion. A yoke assembly is fixed with the bonnet, terminates at an upper end with a drive mechanism, and includes an upper stem with a threaded upper end that is driven between raised and lowered positions by the drive mechanism, the upper stem fixed with the lower stem.

18 Claims, 10 Drawing Sheets

(56) References Cited

U.S. PATENT DOCUMENTS

| | | | |
|---|---|---|---|
| 6,782,949 B2 * | 8/2004 | Cove | E21B 33/035 137/554 |
| 7,426,938 B2 * | 9/2008 | Bohaychuk | E21B 34/02 137/625.33 |
| 2007/0095411 A1 * | 5/2007 | Arnison | E21B 34/02 137/625.37 |
| 2013/0193356 A1 * | 8/2013 | Collison | F16K 41/10 251/89 |

* cited by examiner

LOW-TORQUE CHOKE VALVE FOR WELL AUTOMATION

CROSS-REFERENCE TO RELATED APPLICATIONS

This application claims the benefit of U.S. Provisional Patent Application 61/936,300, filed on Feb. 5, 2014, and incorporated herein by reference.

STATEMENT REGARDING FEDERALLY SPONSORED RESEARCH AND DEVELOPMENT

Not Applicable.

FIELD OF THE INVENTION

This invention relates to remote controlled actuated choke valves, and more particularly to an improved valve requiring very low operating torque or force, requiring less electric power consumption, and thus suitable to be automated by SCADA, RTU with HMI systems used in oil and gas well production.

DISCUSSION OF RELATED ART

Prior art choke valves, such as that taught in U.S. Pat. No. 5,706,856 to Lancaster on Jan. 13, 1998 and other prior art devices, particularly on fluid lines having 15,000 psi or greater, often have a relatively high torque requirement to open and close such valves, resulting in more energy demand and power consumption for remote, relatively large motorized actuators such as those found on motorized actuated chokes. This is due primarily to lack of pressure balance between both sides of the choke and a relatively high seal friction (see FIG. 6 of Lancaster). Such choke valves for use in product wells or oil and gasoline facilities result in higher operating costs.

Remote operation of new art choke valves of for oil production facilities, for example, results in low operating costs. However, prior art valves, particularly on fluid lines having 15,000 psi or greater, often have a relatively high torque requirement to open and close such choke valves, resulting in more energy demand for remote, motorized actuators. Such actuators typically have a high power requirement and cannot be easily set-up at remote locations far from utilities.

Further, prior art choke valves typically have multiple rubber seals (see FIG. 3 of Lancaster) that are susceptible to damage in oil producing and fracking operations due to high concentrations of $CO_2$, $H_2S$, and sand in many of the fluid flows resulting from such operations. Moreover, such prior art valves have a relatively large number of seals contained in seal-cartridges that are difficult to remove from the bonnet due to the corrosive impact of sour gas and carbonic production fluids produced in oil and gas operations. Of the entire bonnet must be replaced when servicing such valves, which is a costly repair. Further, such prior art choke valves have seals that have little sealing value, but must still be maintained and serviced, which further increases seal friction and operating torque.

Therefore, there is a need for a choke valve apparatus that greatly reduces the torque or force required for the opening and closing of the valve, even with line pressures as high as 20,000 psi, through as high as a 98% pressure balance on either side of a valve plug. Such a needed invention would allow the use of relatively small electric actuators that have low current and power consumption to operate, and that can be operated even with a relatively low-cost solar cell and battery system, thereby not requiring access to an electrical utility. Such a needed product would allow operating with low-cost SCADA systems, for example. Regardless of the fluid inlet or outlet pipe size, from 1" to 6", the torque required to open and close such a needed valve would remain relatively low.

Moreover, such a needed invention would have as few as one seal located below an easily-accessed seal packing gland to simplify maintenance and replacement of the seal. Such a needed apparatus would have very little friction between a yoke and an upper and lower stems that is common with prior art products. Moreover, such a needed invention would be easily adapted to a variety of different styles of choke valves, namely oil and gas industry choke-type valve standards such as H2, JWA, OCT style, Flow back, VG1000, Extended Bolt, Studded, Inline, Stepper, Hydraulic, Drilling chokes and valves, and the like. Still further, such a needed invention can be optionally utilized without elastomer O-rings or other rubber parts that are subject to damage by caustic chemicals commonly found in oil and gas production systems.

Prior art devices and also Lancaster type choke valves also have a relatively complicated indicator drive assembly situated in non-machined rough surfaces of the yoke or rectangular tubing (see Lancaster FIGS. 1, 5 and 6). Such prior art indicator drive assemblies include a fabricated sleeve held in place with plastic buttons and pins that slide through the non-machined rough surface of the yoke, resulting often in misread indicator readings. Field service and replacement of such indicators is difficult since the indicator mechanism is a part of the fixed connection of both the lower and upper stems and the assembly guide, and since it is locked by two large tapered nuts located at the upper and lower end of the tubing.

Such prior art devices provide no means of overload protection from higher motor drive torque due to use of fixed joints between the upper and lower stems (see FIGS. 1 and 5 of Lancaster). Particularly when the valve is closed against full differential pressure acting on the seat, relatively high torque is required to unseat the stem from the seat, since there is zero pressure at the outlet and full working pressure at the inlet. Often such high torque requirement to open the choke valve increases the actuator motor's current capacity, thus damaging or burning out the motor, and causes thread damage upper and lower stems including the drive shaft assembly and coupling, which results a relatively high cost of repair and significant down time.

Prior art valves, such as the Lancaster-type choke valve, use an unthreaded choke seat. Just to retain and hold the choke seat in the body and seal it, the prior art Choke valve uses three parts: 1) seat retainer, 2) bonnet, and 3) internal threaded wing nut inside the choke body (refer to FIG. 1 of Lancaster). These three parts and the lower stem reduce volume within the body cavity and result in greater fluid turbulence, wear and tear within the body and the internal parts, which further increases required torque to move the valve as well as additional wear and tear on the internal components of such devices. Further, such valves often result in the choke seat getting stuck into the chock body cavity due to corrosive activity at the seating area. As such a valve seat utilizes an elastomer rubber seal, often such seal is worn prematurely and are destroyed internally. A stuck choke seat in such a choke body can only be removed by attempting to pull the seat out of the corroded body outlet area, requiring in some instances that the choke body has to be removed from the well just to push the choke seat out from the outlet of the body. As such, prior art valves of this type are often costly to service in the field and expensive to manufacture and assemble in the first place.

Lancaster and other prior art devices have further drawback that a single tubing structure holds the bonnet and upper hardware assembly, the indicator drive assembly and the upper and lower stems with a fixed coupling (see Lancaster FIGS. 1 and 5). Such a one-piece design makes assembly, disassembly, and servicing complicated due to the difficulty of aligning the drive shaft, upper stem and lower stems. Further, such a device results in the need for additional bearings and results in greater rotational friction. Large tapered nuts at both ends of such tubing assembly are difficult to assemble, disassemble and service.

Moreover, the manual override assembly of the prior art devices requires a complicated handle and drive assembly to facilitate manual override of the valve (refer to Lancaster FIG. 4). The present invention accomplishes these objectives and overcomes the drawbacks of the prior art.

SUMMARY OF THE INVENTION

The present device is a dual functional manual and actuated choke valve system for controlling the flow of fluid, such as a high-pressure hydrocarbon stream, between a source and a receiver. The valve is a pressure-balanced choke valve used for high pressure fluids and actuated with an electric actuator and controller, monitored and operated through automated systems such as remote HMI, RTU, or SCADA-type systems, for example. A choke valve body has a valve chamber with an inlet and an outlet. A seat is disposed within the valve chamber.

A lower stem has an upper portion and a lower portion. The lower portion has an upper end and a lower end and terminates at the lower end thereof with a choke trim, such as a conical choke-type plug, a cylindrical gate-type plug, or the like. A conduit traverses the lower portion of the lower stem between at least one plug tip aperture traversing the plug to at least one top aperture traversing the upper end of the lower portion of the lower stem.

The lower portion of the lower stem is slidably retained at least partially within the valve body chamber between a closed position and an open position. In the closed position the plug tip abuts the seat or closes vertical slots of the seat or occludes vertical slots of the seat, to prevent fluid flow between the inlet and the outlet. In the open position the plug-tip is axially retracted from the seat to permit fluid flow between the inlet and the outlet.

A bonnet is selectively fixed with the valve body and has a bonnet chamber axially aligned with the lower portion of the lower stem for receiving the lower portion at least partially and slidably therein. The bonnet includes a bore that is axially aligned with the lower portion of the lower stem and includes at least one annular seal or bushing. Preferably the bonnet is selectively fixed with a threaded portion of the valve body at a metal-to-metal seal by a wing/bonnet nut. The metal-to-metal seal prevents the fluid from leaking between the valve body and the bonnet when the wing nut is tightened.

The upper portion of the lower stem is axially aligned with and fixed at a lower end thereof with the upper end of the lower portion. The upper portion of the lower stem is axially retained within the bore of the bonnet and the annular seal. The diameter of the upper portion is the relative smaller than the diameter of lower portion. This diameter remains constant; regardless the orifice sizes 1", 2" up to 6" or larger orifice of the choke valves to achieve lowest operating torque.

A yoke assembly is selectively divided into two distinguished parts: 1) support plate and 2) U-back. The support plate connects with the upper portion of the bonnet and terminates at a lower end of the U-back with a rotational drive mechanism. The U-Back assembly includes an upper stem that is axially aligned with the lower stem and has a threaded upper end, axially aligned with the drive shaft. The lower end of the upper stem is part of a breakaway stem coupling or fixed coupling that is coupled with the upper end of the upper portion of the lower stem. Design of the yoke assembly in two parts provides the ability to accommodate high pressure wetted area separating the upper drive mechanism and the electric actuator, thus making the total assembly easier to manufacture, hydro test, field service, maintain, and the like.

Further the present invention includes a simplified indicator design that is embedded in a polished indicator housing-sleeve tightly attached to the upper stem. Such an indicator design is simpler and follows a classic pattern that is well recognized in the industry and more easily read.

The middle portion of the upper stem is equipped with a rotary indicator housing-sleeve containing an indicator drum, meter marked on the circumference with up to $64^{th}$ of diameter, representing the choke trim opening for the orifice diameter, preferably in inches. The indicator is externally attached to the drive shaft. The linear up and down movement of the upper and lower stems and indicator housing indicates the diametrical opening of the choke trim. Such an indicator may be made from a wide variety of the materials such PVC, Delrin, Aluminum, stainless steel and the like. A shoulder bolt passing through the vertical slot in the U-Back connects at another end into the indicator housing. Operation of the choke valve results in up and down movement of the shoulder bolt converting the rotational motion of the drive shaft to a linear motion of the upper stem coupled with upper portion of the lower stem. An internally-threaded rotational drive shaft captures up and down motion of the threaded upper end of the upper stem between a raised position with shoulder bolt that corresponds with the open position of the stem tip (plug) and choke valve apparatus, and also a lowered position corresponding to the closed position of the choke trim and choke valve apparatus.

Preferably the upper end of the U-Back assembly is selectively fixed with bottom side of the thrust housing. The U-back assembly may further include having at least one slot therein aligned with the upper and lower stems. The at least one slot is adapted for slidably capturing the shoulder bolt therein that transversely engages with the upper and lower stems, to prevent rotation of the upper and lower stems, by the drive shaft. The rotational drive mechanism further preferably includes a thrust assembly, disposed about the drive shaft that includes at least one thrust bearing each end of it, to prevent axial movement of the drive shaft while facilitating rotational movement of the drive shaft. The drive shaft may terminate at a top end thereof with a hex coupling, such that a handle wrench or wheel may be used to manually rotate the nut to move the valve apparatus between the closed and open positions.

Preferably the yoke assembly is selectively fixed with a top side of the bonnet at a yoke support plate of the bonnet. The yoke assembly may further include a yoke having at least one slot therein aligned with the upper and lower stems. The at least one slot is adapted for slidably capturing a shoulder bolt therein that transversely engages with the upper and lower stems, to prevent rotation of the upper and lower stems by a drive stem or shaft.

The rotational drive mechanism further preferably includes a thrust assembly disposed about the drive shaft that includes at least one thrust bearing to prevent axial movement of the drive shaft while facilitating rotational movement of the drive shaft. The drive shaft may terminate at a top end thereof with a nut or hex coupling, such that a handle wrench or wheel may be used to manually rotate the nut to move the valve apparatus between the closed and open positions. Alternately, the drive shaft terminates at an actuator coupling, such that an electrically-driven valve actuator engaged with the actuator coupling may be used to remotely move the valve apparatus between the closed and open positions.

In use, the bonnet chamber at the lower end of the upper portion of the lower stem is always in fluid communication with the inlet through the at least one top aperture of the upper end of the lower portion of the lower stem, the conduit, and the at least one plug aperture of the plug, such that the fluid pressure at the upper portion of the lower stem is substantially equal to the fluid pressure at the inlet. As such, the annular seal prevents the fluid from leaking between the upper portion of the lower stem and the bore of the bonnet. Further, but pressure of the at least one annular seal against the lower stem accounts for most of the friction that must be overcome for the rotational drive mechanism to move the plug between the open and closed positions.

The present invention is a valve apparatus that greatly reduces the torque or force required for the opening and closing of the valve, even with line pressures as high as 20,000 psi, through as high as a 98% pressure balance on either side of the valve plug. The present device allows for the use of relatively small electric actuators that have low current and power consumption to operate, as low as 1.0 amp. As such, the present invention can be operated even with a relatively low-cost solar cell and battery system, thereby not requiring access to an electrical utility, such as a remote HMI, RTU, or SCADA-type systems, for example. Regardless of the fluid pipe size, from 1" to 8", the torque required to open and close a valve of the present invention remains relatively low and thereby more suitable for automated systems. An entire field of 50 or more wellheads may be automated, for example, with the present system, greatly reducing the cost of fields requiring electric lines run to each valve for higher-voltage actuators.

Moreover, the present device has as few as one seal located behind an easily-accessed seal and lubrication packing plug to simplify maintenance and replacement of the seal, without require complete disassembly of the yoke and/or valve. The present device results in a minimum of friction between a yoke and an upper stem, and the lower stem and the seals, that is common with prior art products. In the present device, the seal is located in a packing gland away from the bonnet pressure chamber for ease of accessibility, resulting in more efficient sealing with a minimum of friction between the yoke and the lower stem. Moreover, the present device is easily adapted to a variety of different styles of valves and chokes, namely oil and gas industry standards such as H2, JWA, OCT, Flow back, AGC, Extended Bolt, In Line or Angled, Studded, Bolted, Winged, Stepper or Linear, Manifold, Drilling, AG1000 and the like. Still further, the present invention can be optionally utilized without elastomeric seals or other rubber parts that are subject to damage by caustic chemicals commonly found in oil and gas production systems, both on land and at sea.

Further, the present invention includes a simplified indicator design that is embedded in the polished sleeve, tightly attached to the upper stem. Such an indicator design is a more simple and classic indicator design that is well recognized in the industry, and more easily read. Such an indicator may be made from a wide variety of suitable materials such as PVC, Delrin, Aluminum, stainless steel, or the like, allowing calibration down to $64^{th}$ diameter, unit percentage or millimeter linear travel distances with little error. Using two pieces of U-back tubing allows the chock body to be separated from the indicator and motor drive assembly.

The breakaway actuator or stem coupling of the present invention disconnects the choke valve from the actuator motor between the upper and lower stems in the present device in the event of an over-torque situation, such as while attempting to move the valve from one position to the other when the valve is stuck. The threaded seat of the present invention that includes a metal-to-metal seal between the inlet and outlet results in greater valve cavity volume, less fluid turbulence therein during use, greater reliability and lower cost servicing. Further, the two-piece yoke design of the present invention allows for easy separation of the actuator from the choke by simply removing the coupling held by bolts and nuts. As a result, the pressure seal situated under the packing gland may be readily replaced, and the chock trim (lower stem and seat) can be easily changed within a short time without affecting the electrical actuator connection and the upper hardware assembly.

The present invention further includes a relatively simple handle for manually overriding the actuator of the valve. Such a handle may be readily detached when not in use, and includes relatively few parts. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
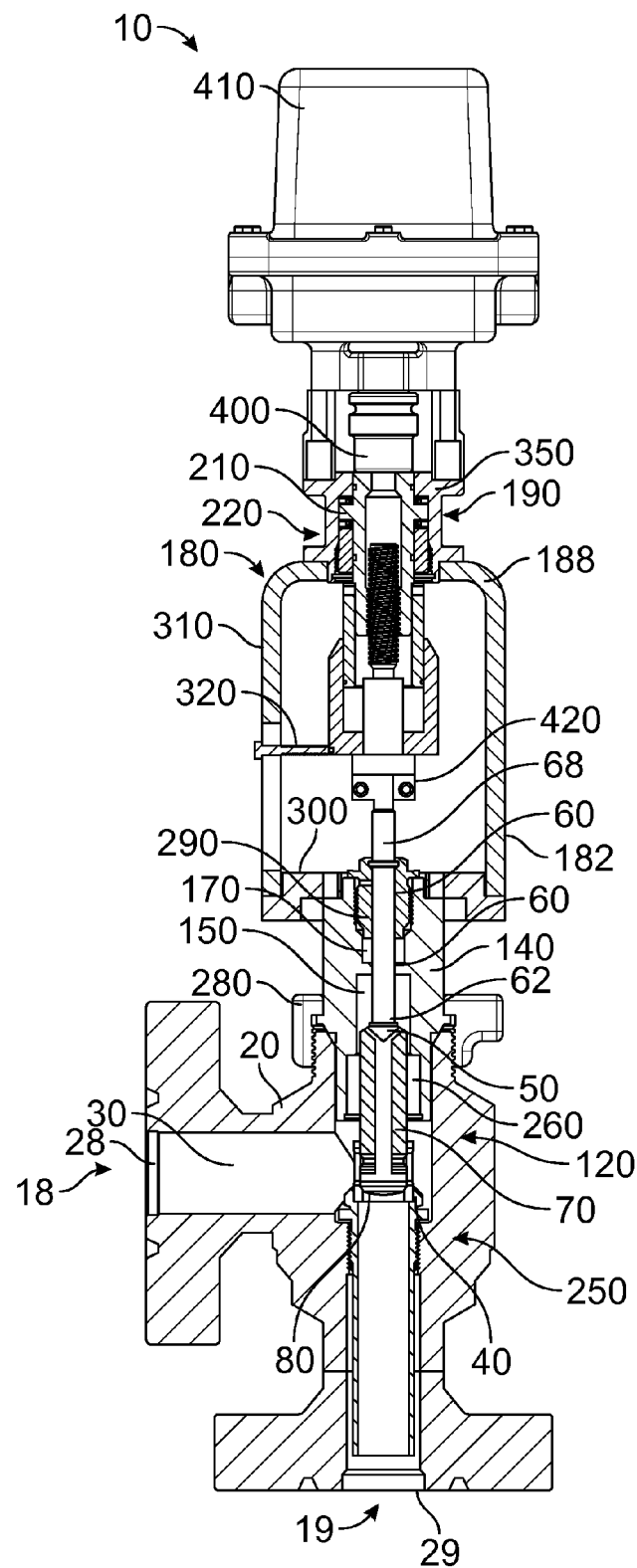
FIG. 1 is a cross-sectional diagram of a valve apparatus of the present invention, illustrated in a closed position.
Figure 2:
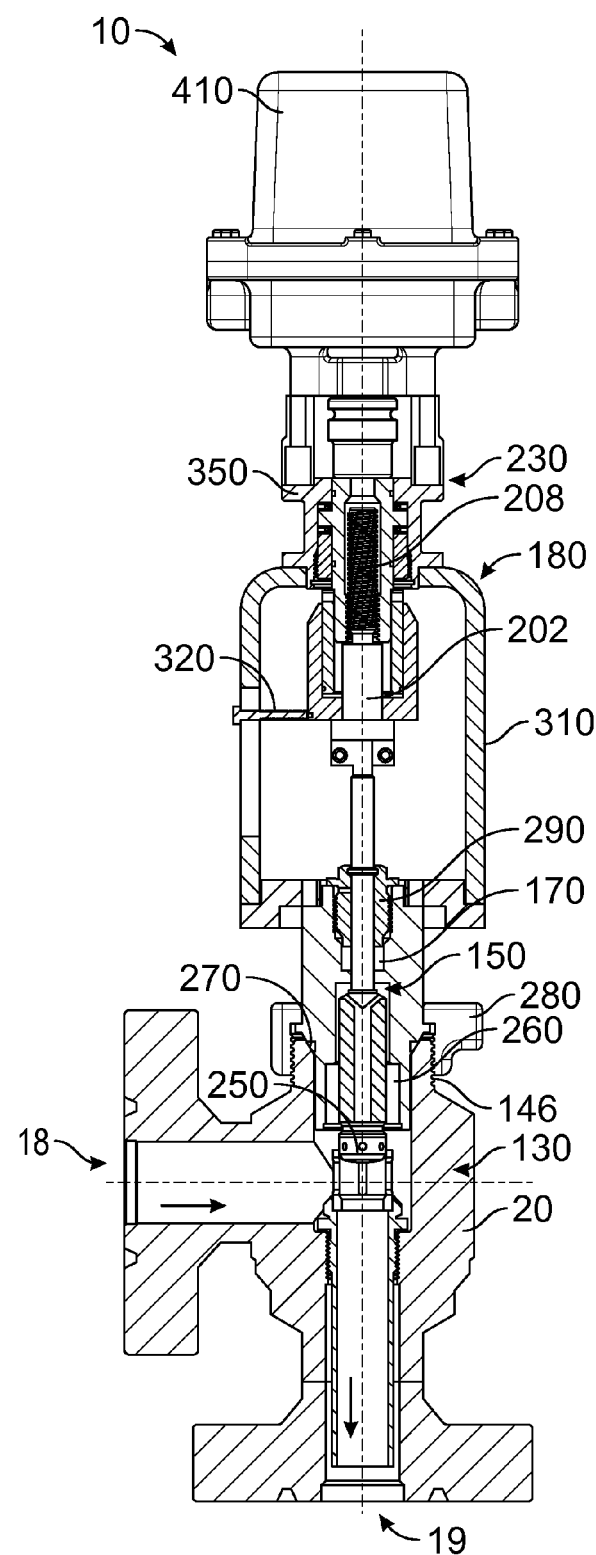
FIG. 2 is a cross-sectional diagram of a valve apparatus of the present invention, illustrated in an open position.

FIGS. 1 and 2 illustrate a valve apparatus 10 for controlling the flow of fluid, such as a high-pressure hydrocarbon stream, between a source 18 and a receiver 19. The source 18 may be an oil well, for example, and the receiver 19 may be a storage tank (not shown), or the like.

A rigid, metallic valve body 20 has a valve chamber 30 with an inlet 28 and an outlet 29. In one embodiment, the valve chamber 30 includes a bleed aperture 440 and a bleed nut 430 that is threadably engaged with the bleed aperture 440, such that the valve chamber 30 may be drained at the bleed aperture 440. The valve body 20 is preferably made with a hardened steel or iron material.

Figure 3:
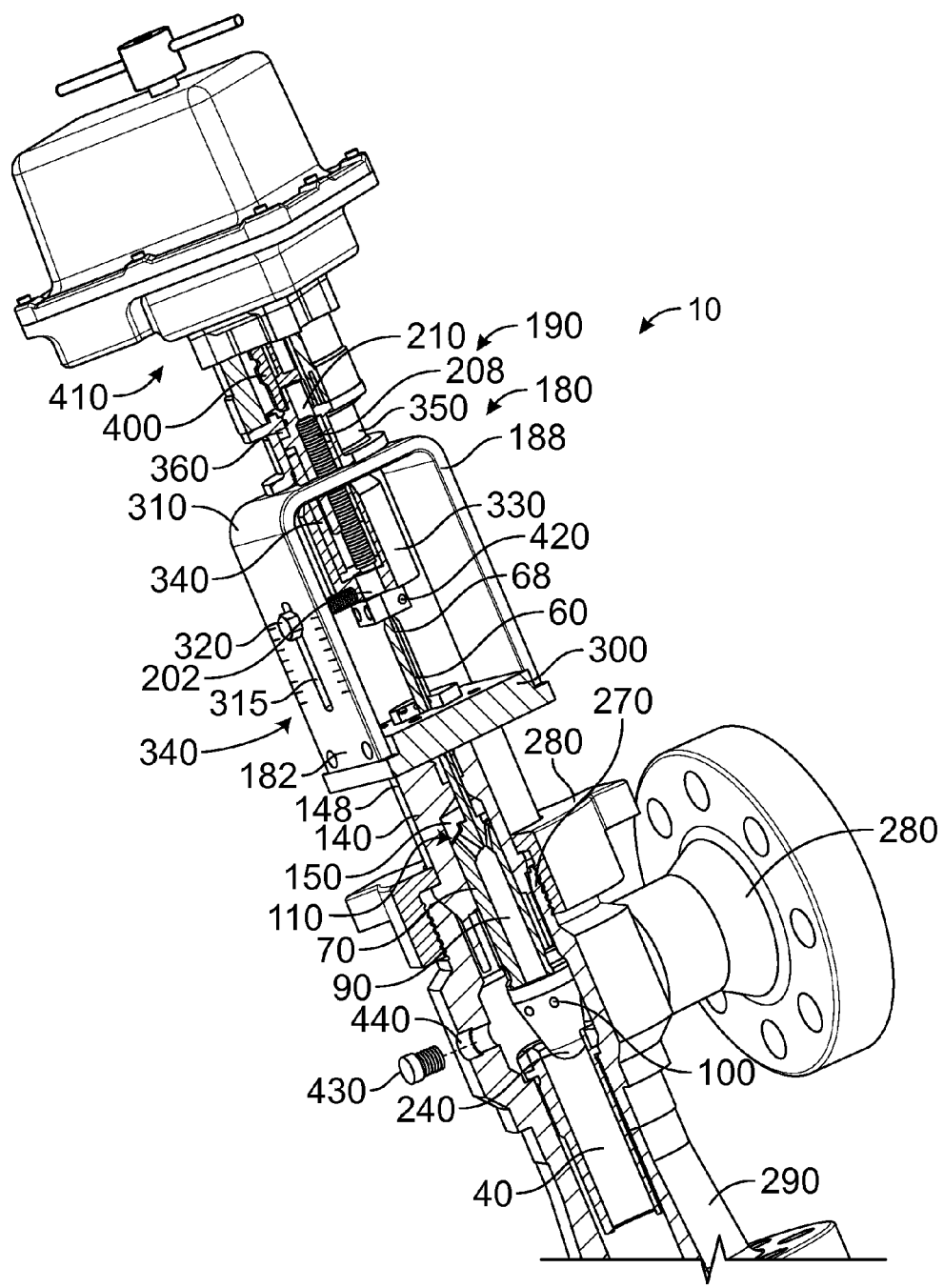
FIG. 3 is a partial perspective view, partially cut-away, of a valve apparatus of the present invention, illustrating an alternate choke-type valve plug.

A seat 40 is disposed within the valve chamber 30, preferably with a threaded, metal-to-metal seal 270 (FIGS. 2 and 3). The seat 40 is preferably made from a relatively hard material, such as a carbide material embedded in a jacket made from materials such as nickel based alloy or chrome base alloy such as stainless steel.

Figure 4:
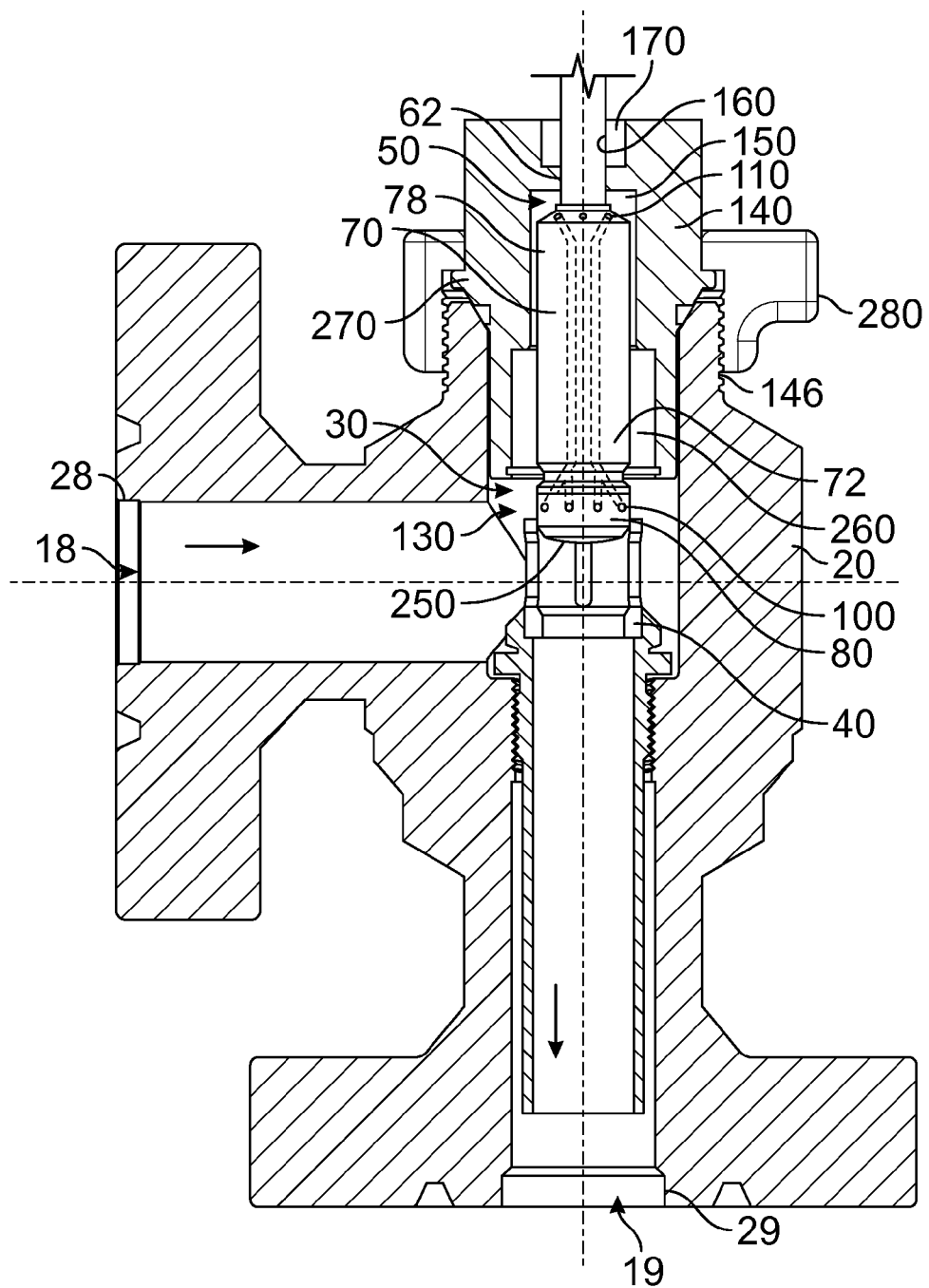
FIG. 4 is an enlarged, partial cross-sectional view of FIG. 2, illustrating a valve body.
Figure 5:
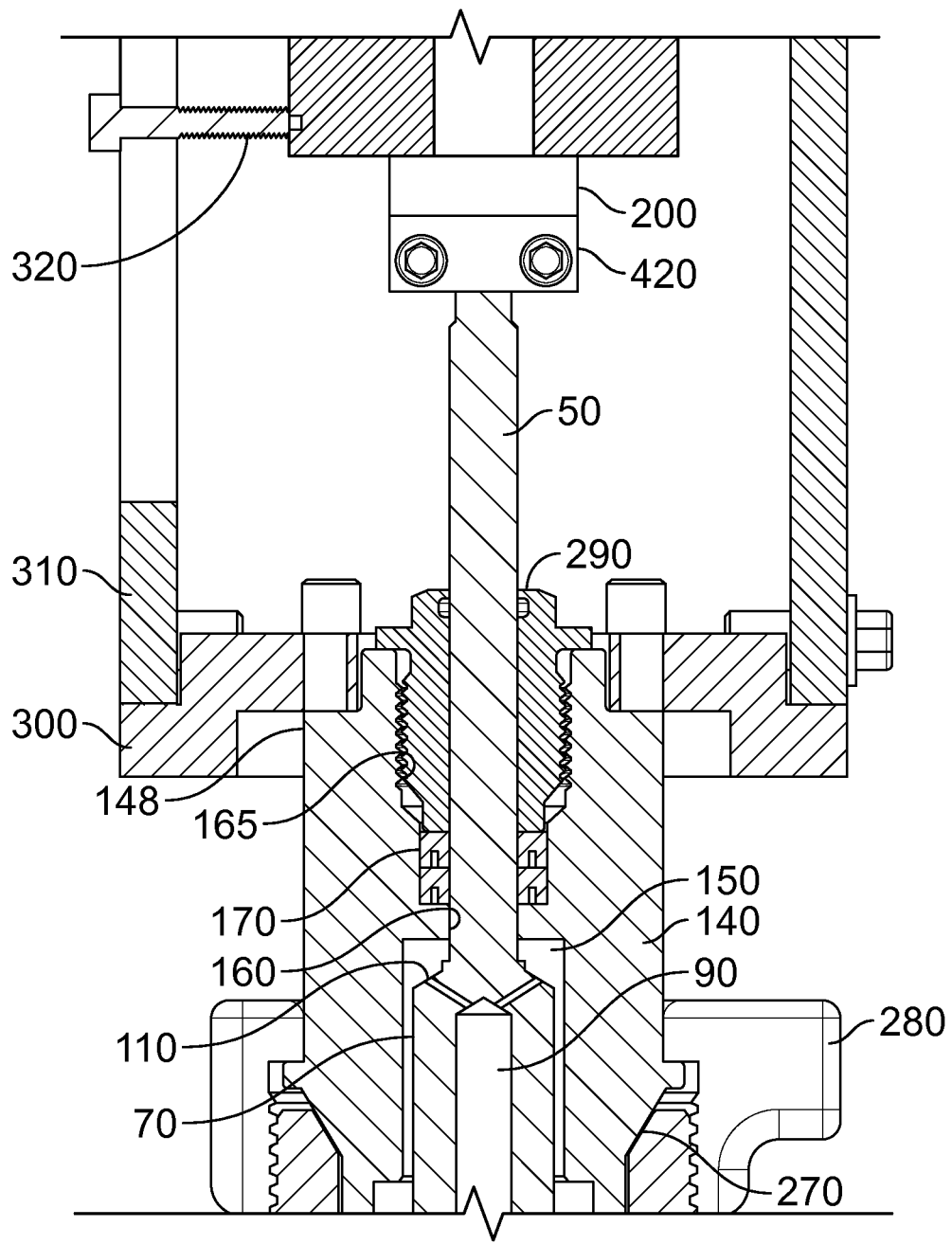
FIG. 5 is an enlarged, partial cross-sectional view of FIG. 2, illustrating a bonnet and a portion of a yoke assembly.

A lower stem 50 has an upper portion 60 and a lower portion 70. The lower portion 70 has an upper end 78 and a lower end 72 and terminates at the lower end 72 thereof with a plug 80. In one embodiment, the plug 80 is a conical choke-type plug 240 (FIG. 3). Alternately the plug 80 may be a generally cylindrical gate-type plug 250 (FIGS. 1, 2 and 4). Preferably the plug 80, like the seat 40, is made from a relatively hard carbide material, stainless steel or nickel materials with a silver soldered carbide tip, or other suitably hard, strong and durable material. A conduit 90 traverses the lower portion 70 of the lower stem 50 between at least one plug aperture 100 traversing the plug 80 to at least one top aperture 110 traversing the upper end 78 of the lower portion 70 of the lower stem 50 (FIGS. 3-5).

The lower portion 70 is slidably retained at least partially within the valve chamber 30 between a closed position 120 and an open position 130. In the closed position 120 the plug 80 abuts the seat 40 to prevent fluid flow between the inlet 28 and the outlet 29. In the open position 130 the plug 80 is axially retracted from the seat 40 to permit fluid flow between the inlet 28 and the outlet 29. In one embodiment, the lower portion 70 of the lower stem 50 is axially maintained within the valve chamber 30 with at least one annular U-ring 260 situated between the at least one top aperture 110 and the at least one plug aperture 100.

A bonnet 140 is selectively fixed with the valve body 20 and has a bonnet chamber 150 axially aligned with the lower portion 70 of the lower stem 50 for receiving the lower portion 70 at least partially and slidably therein. The bonnet 140 includes a bore 160 that is axially aligned with the lower portion 70 and includes at least one annular seal 170.

Preferably the bonnet 140 is selectively fixed with a threaded portion 146 of the valve body 20 at a metal-to-metal seal 270 by a wing nut 280 (FIGS. 1-4). The metal-to-metal seal prevents the fluid from leaking between the valve body 20 and the bonnet 140 when the wing nut 280 is tightened. In one preferred embodiment, the bore 160 of the bonnet 140 further includes a threaded, annular packing nut 290 (FIGS. 1, 2, 5 and 6) through which the upper portion 60 of the lower stem 50 is slidably retained. The bore 160 includes a packing nut thread 165 for engaging the packing nut 290, such that the annular seal 170 may be accessed an lubricated from outside of the bonnet 140 by removing the packing nut 290.

The upper portion 60 of the lower stem 50 is axially aligned with and fixed at a lower end 62 thereof with the upper end 78 of the lower portion 70. The upper portion 60 is slidably retained within the bore 160 of the bonnet 140 and the annular seal 170. The diameter $D_u$ of the upper portion 60 is at most one-half of the diameter $D_l$ of the lower portion 70.

Figure 8:
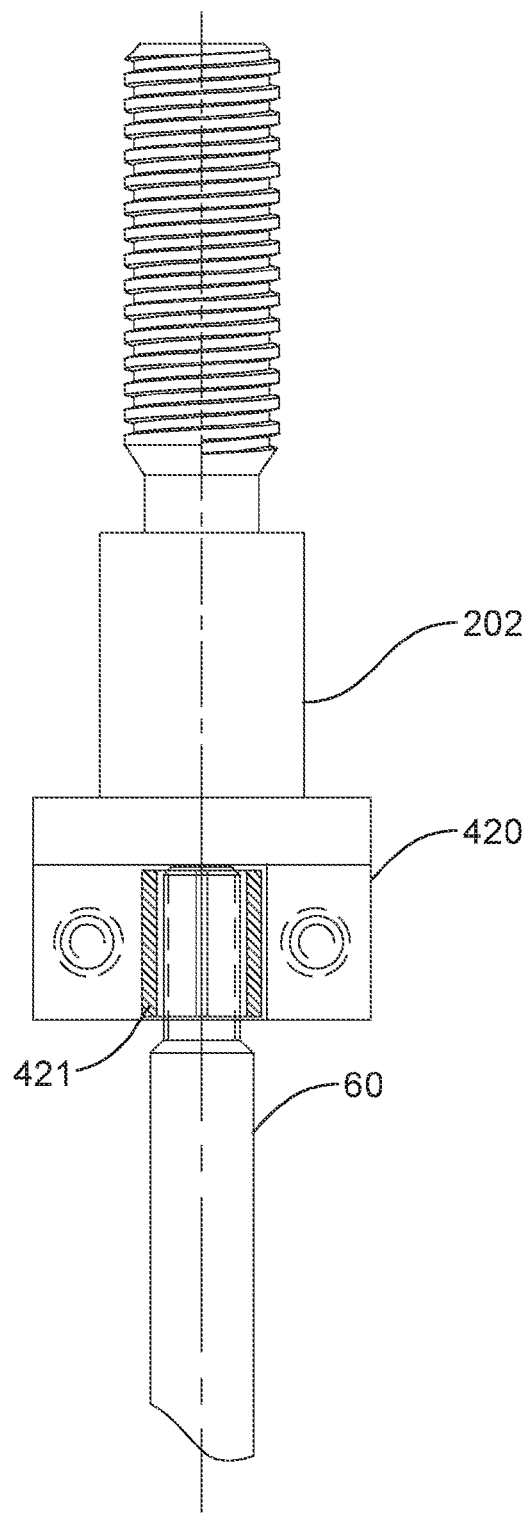
FIG. 8 is a cross-sectional view of a breakaway coupling of the invention.

A yoke assembly 180 is selectively fixed at a lower end 182 thereof with the bonnet 140 and terminates at an upper end 188 thereof with a rotational drive mechanism 190. The yoke assembly 180 includes an upper stem 200 that is axially aligned with the lower stem 50 and has a threaded upper end 208 and a lower end 202 that is fixed with the upper end 68 of the upper portion 60 of the lower stem 50, preferably at a breakaway coupler 420 (FIG. 8). The rotational drive mechanism 190 includes an internally-threaded rotational drive shaft 210 that captures and drives the threaded upper end 208 of the upper stem 200 between a raised position 230 that corresponds with the open position 130 of the plug 80, and a lowered position 220 corresponding to the closed position 120 of the plug 80.

The breakaway coupler 420 includes a frictional threaded sleeve 421 that slides out from the coupling 420 with the lower stem 50 when a torque limit threshold is reached. The upper stem 200 thereafter experiences a substantially zero load, preventing damage to the valve actuator 410. Further, the threads on both the upper and lower stems 200,50 are not damaged. Replacement of the coupling 420 is accomplished by reducing fluid flow to the valve apparatus 10, and the coupling 420 is then easily replaced.

Preferably the yoke assembly 180 is selectively fixed with a top side 148 of the bonnet 140 at a yoke support plate 300 (FIG. 9) of the bonnet 140. The yoke assembly 180 may further include a yoke 310, or U-back, having at least one slot 315 therein aligned with the upper and lower stems 50,200. The at least one slot 315 is adapted for slidably capturing a shoulder bolt 320 therein that transversely engages with the upper and lower stems 50,200 to prevent rotation of the upper and lower stems 50,200 by the drive shaft 210, whereby rotary motion is converted to linear motion.

Figure 6:
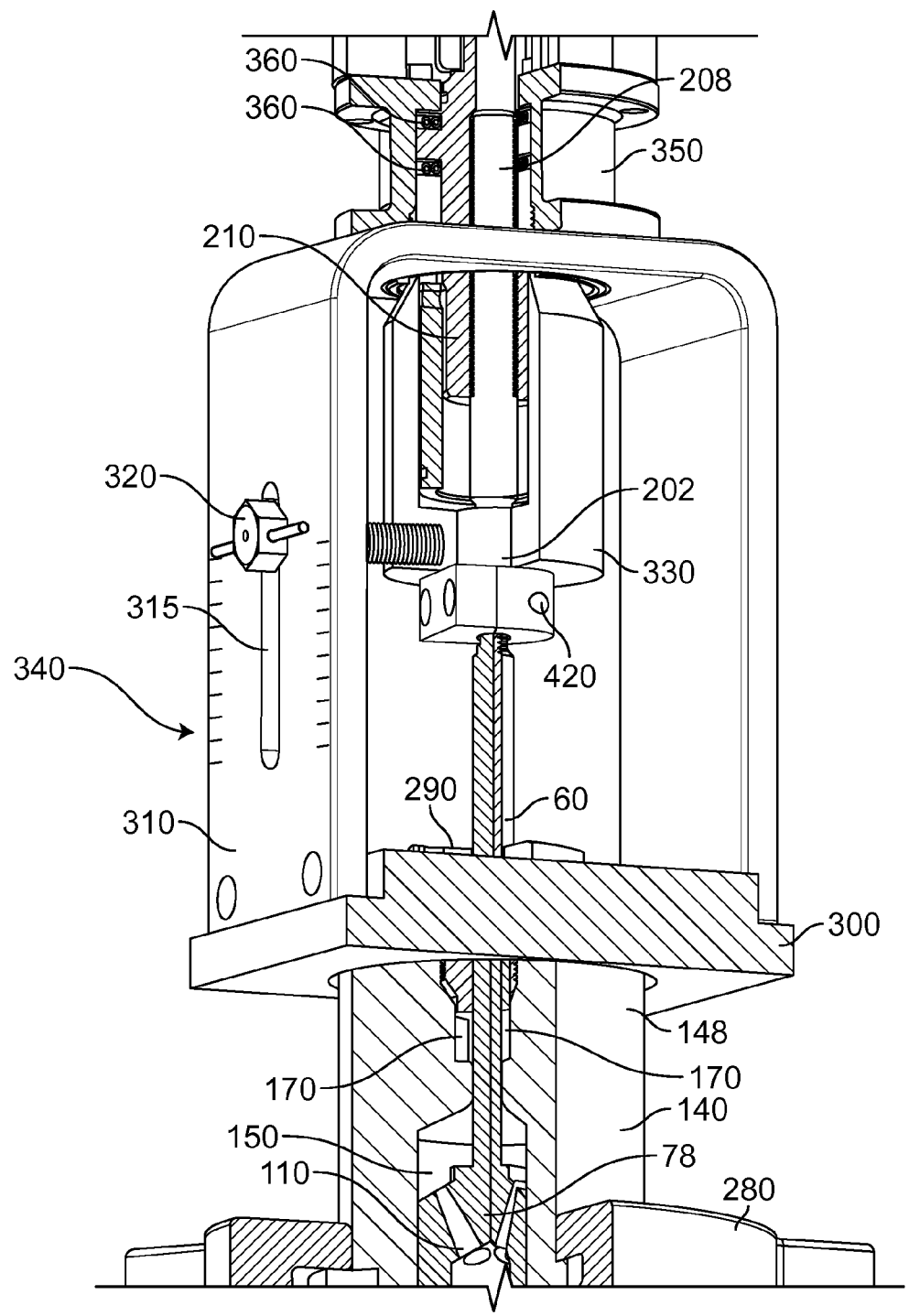
FIG. 6 is a partial perspective view, partially cut-away, of FIG. 2, illustrating the yoke assembly.
Figure 9:
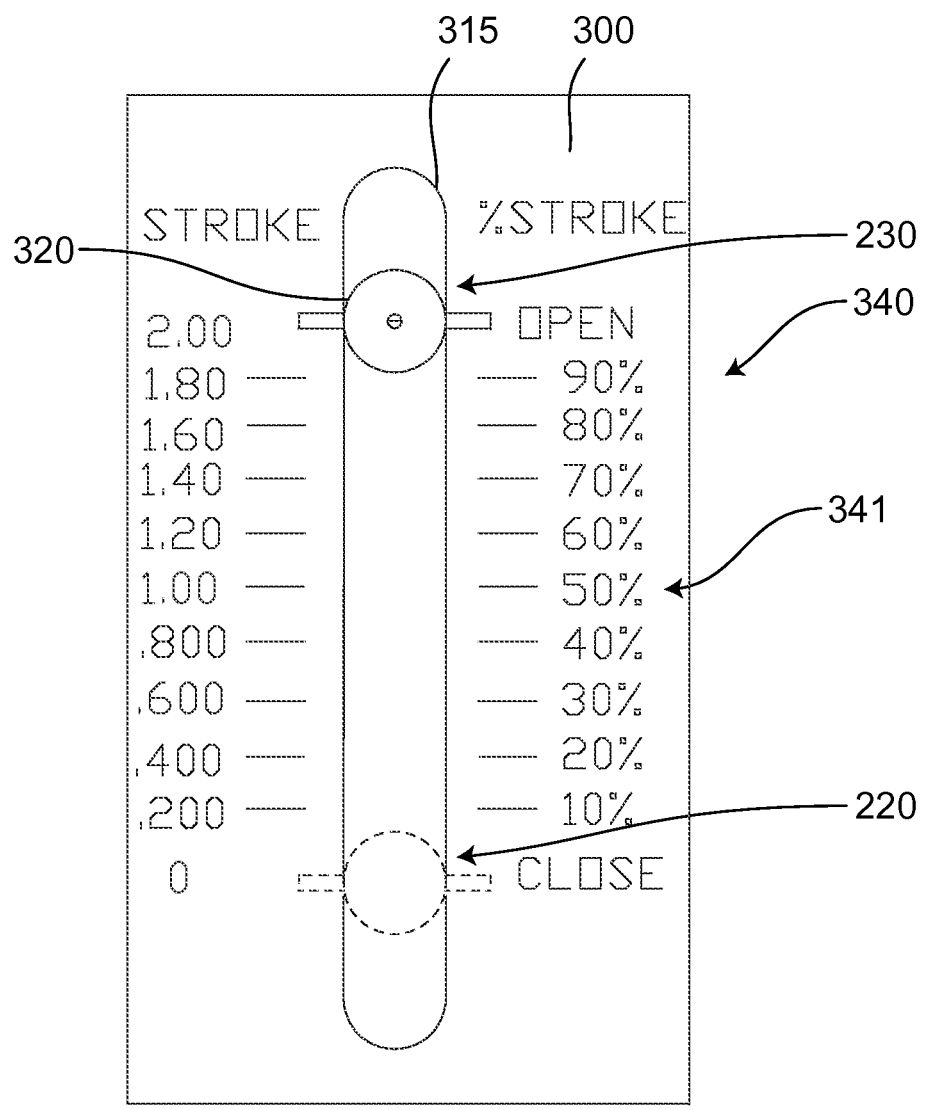
FIG. 9 is a front elevational view of an indicator of the invention.

In one embodiment the yoke assembly 180 further includes an outer indicator sleeve 330 fixed with the upper stem 200 and an inner indicator 340 fixed with the yoke assembly 180 and within the indicator sleeve 330 (FIGS. 3, 6 and 9). As such, as the upper stem 200 moves from the raised position 230 to the lowered position 220, the indicator sleeve 330 moves away from the indicator 340 to reveal progressively more of the indicator 340, which has indicia 341 (FIG. 9) thereon corresponding to the position of the plug 80 within the seat 40.

Figure 7:
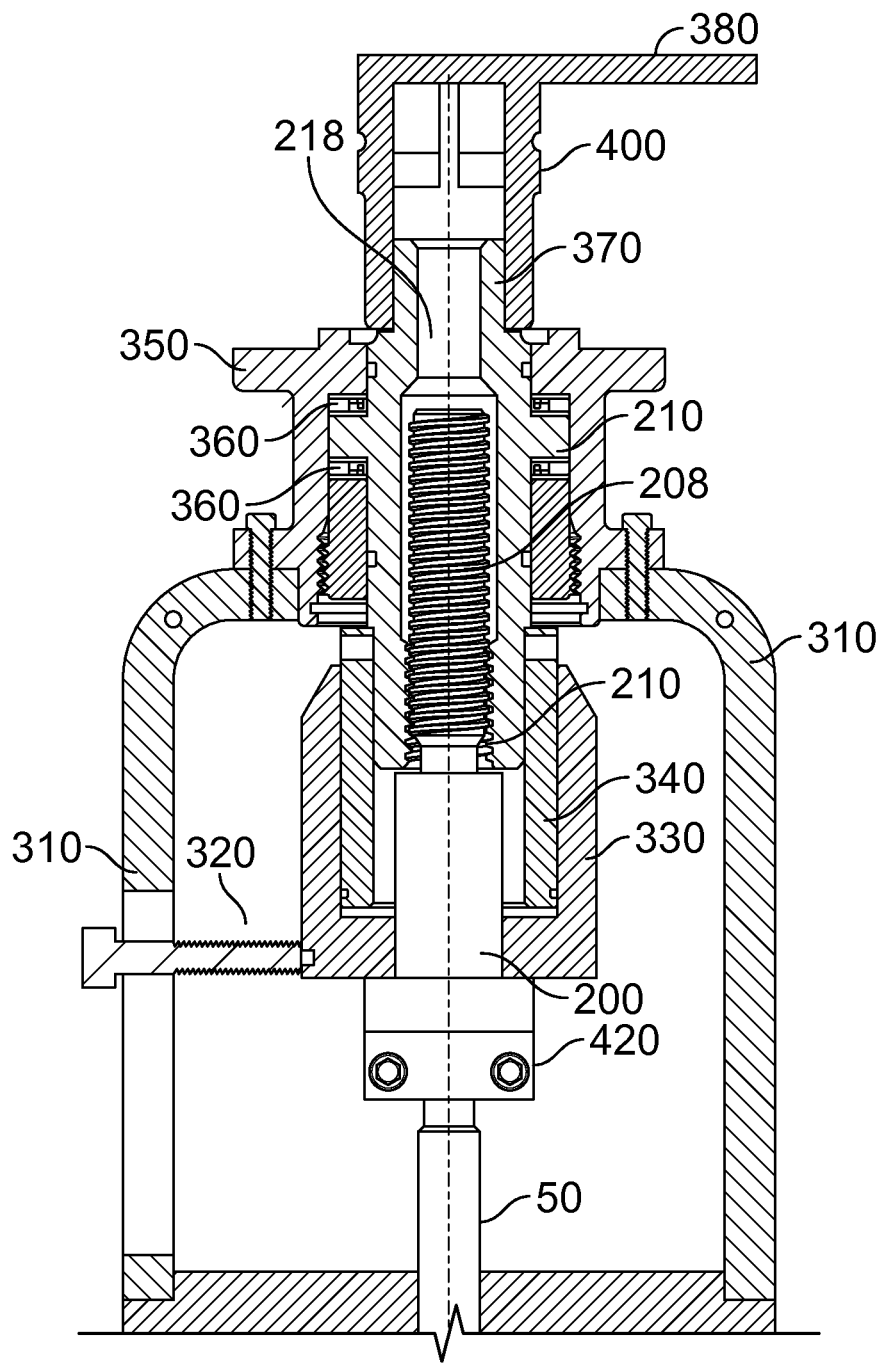
FIG. 7 is an enlarged, partial cross-sectional view of FIG. 2, illustrating the yoke assembly and a thrust assembly.

The rotational drive mechanism 190 further preferably includes a thrust assembly 350 disposed about the drive shaft 210 that includes at least one thrust bearing 360 to prevent axial movement of the drive shaft 210 while facilitating rotational movement of the drive shaft 210 (FIG. 7). The drive shaft 210 preferably terminates at a top end 218 thereof with a nut 370, such that a handle wrench 380 or wheel (not shown) may be used to manually rotate the nut 370 to move the valve apparatus 10 between the closed and open positions 120,130. Alternately, the drive shaft 210 terminates at a breakaway actuator coupling 400, such that an electrically-driven valve actuator 410 engaged with the actuator coupling 400 may be used to remotely move the valve apparatus 10 between the closed and open positions 120,130.

In use, the bonnet chamber 150 at the lower end 62 of the upper portion 60 of the lower stem 50 is always in fluid communication with the inlet 28 through the at least one top aperture 110 of the upper end 78 of the lower portion 70 of the lower stem 50, the conduit 90, and the at least one plug aperture 100 of the plug 80, such that the fluid pressure at the upper portion 60 of the lower stem 50 is substantially equal to the fluid pressure at the inlet 28. As such, the annular seal 170 prevents the fluid from leaking between the upper portion 60 of the lower stem 50 and the bore 160 of the bonnet 140. Further, but pressure of the at least one annular seal 170 against the lower stem 50 accounts for most of the friction that must be overcome for the rotational drive mechanism 190 to move the plug 80 between the open and closed positions 130,120.

Example

A valve apparatus 10 identified as Prototype Choke AA200 Choke Assembly with a 4-20 mA electric Bettis-brand Actuator 410, as heretofore described, was tested for several days in August of 2013 at three different pressures (5000 psi, 10,000 psi, and 14,000 psi), cycling the valve a minimum of 160 times under pressure. The valve apparatus 10 was initially cycled 50 times at 5,000 psi, and resulting in a required 10.7 ft-lbs of torque to close the valve, and 5.3 ft-lbs to open the valve apparatus 10. Next, a room temperature of 86-degrees F., at a pressure of 10,500 psi, the torque required to close the valve apparatus 10 was 17.0 ft-lbs, and to open the valve apparatus 10 required 9.0 ft-lbs. Then, at a pressure of 14,000 psi, the torque required to close the valve apparatus 10 was 23.3 ft-lbs, and to open the valve apparatus 10 required 11.2 ft-lbs. All test checked good with no leaks. The valve apparatus 10 was cycled a total of 270 times with pressures up to 14,000 psi. In one test with the electric actuator 410, at 5,000 psi the motor drew 1.2 amps to open and close the valve apparatus 10. AT 7,500 psi the actuator 410 required 1.6 amps to actuate the valve apparatus 10. At 10,500 psi, the actuator 410 still only required 1.6 amps to actuate the valve apparatus 10.

Figure 10:
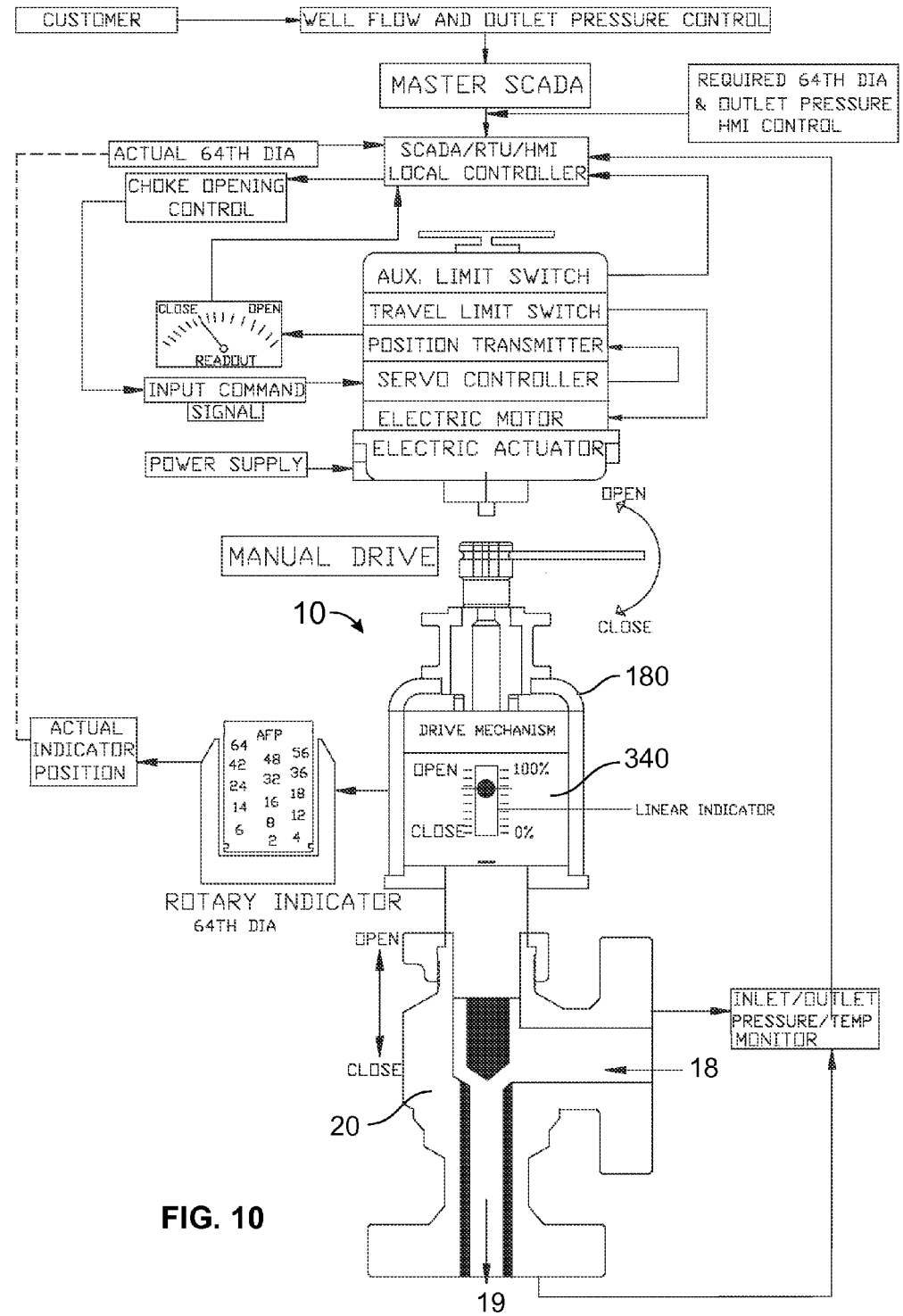
FIG. 10 is a flow diagram of the actuated choke of the present invention used for well automation

FIG. 10 illustrates a flow diagram of the actuated choke valve 10 used for the oil and gas well flow automation. The fluid enters in the inlet 28 of the choke valve 10 at higher pressure from an adjoining gate valve (now shown), for example. The fluid passes through the outlet 29 of the choke valve 10 depending upon the position of the plug 80 attached to the lower stem 50. A command signal is initiated from a SCADA system, for example, based upon the requirement of the differential pressure of the outlet 29. From the required output of the well the orifice diameter is selected by the customer, through SCADA, and through the well operator. The command signal is initiated from the master SCAD to a local controller. The electric actuator starts to operate the choke valve mechanism for the opening, in $64^{th}$ diameter increments. Once the required opening is reached the controller send the feedback signal to SCADA or local controller, completing a closed loop system. The pressure is monitored at the output 29 to produce the required fluid flow. The trim position of the choke or plug 80 is changed by operating the choke valve 10 to achieve a required outlet pressure. Thus the actuated choke valve 10 is used for controlling, throttling, and monitoring the flow from the well.

While a particular form of the invention has been illustrated and described, it will be apparent that various modifications can be made without departing from the spirit and scope of the invention. For example, while a choke-type plug 80 and a cylindrical gate-type plug 250 are illustrated, other types of valve plugs 80 could be utilized with the present invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A choke valve apparatus for controlling the flow of fluid between a source and a receiver, comprising:
    a choke valve body having a choke valve chamber with an inlet and an outlet; a seat disposed within the choke valve chamber;
    a lower stem having an upper portion and a lower portion, the lower portion having an upper end and a lower end and terminating at the lower end thereof with a plug, a conduit traversing the lower portion between at least one plug aperture traversing the plug to at least one top aperture traversing the upper end of the lower portion, the lower portion slidably retained at least partially within the choke valve chamber between a closed position wherein the plug abuts the seat to prevent fluid flow between the inlet and the outlet, and an open position wherein the plug is axially retracted from the seat to permit fluid flow between the inlet and the outlet, the conduit venting the choke valve chamber in the closed position;
    a bonnet selectively fixed with the choke valve body and having a bonnet chamber axially aligned with the lower portion for receiving the lower portion at least partially and slidably therein, the bonnet including a bore axially aligned with the lower portion, the bore including at least one annular seal, the conduit comprising a flow-path having openings only at the top aperture positioned within the bonnet chamber and the at least one plug aperture;
    the upper portion of the lower stem axially aligned with and fixed at a lower end thereof with the upper end of the lower portion, the upper portion slidably retained within the bore of the bonnet and the annular seal, the upper portion being at most one-half of the diameter of the lower portion; and
    a yoke assembly selectively fixed at a lower end thereof with the bonnet and terminating at an upper end thereof with a rotational drive mechanism, the yoke assembly including an upper stem axially aligned with the lower stem and having a threaded upper end and a lower end fixed with the upper end of the upper portion of the lower stem, the rotational drive mechanism including an internally-threaded rotational drive shaft that captures and drives the threaded upper end of the upper stem between a raised position corresponding with the open position of the plug and lowered position corresponding to the closed position of the plug;
    whereby the bonnet chamber at the lower end of the upper portion of the lower stem is always in fluid communication with the inlet through the at least one top aperture of the upper end of the lower portion, the conduit, and the at least one plug aperture such that the fluid pressure at the upper portion of the lower stem in substantially equal to the fluid pressure at the inlet, the annular seal preventing the fluid from leaking between the upper portion of the lower stem and the bore of the bonnet.

2. The choke valve apparatus of claim 1 wherein the plug is a generally conical choke-type plug.

3. The choke valve apparatus of claim 2 wherein the plug and seat are both made from a relatively hard carbide material embedded in a jacket comprised of a nickel or chrome-based material.

4. The choke valve apparatus of claim 1 wherein the plug is a generally cylindrical gate-type plug.

5. The choke valve apparatus of claim 4 wherein the plug and seat are both made from a relatively hard carbide material embedded in a jacket comprised of a nickel or chrome-based material.

6. The choke valve apparatus of claim 1 wherein the lower portion of the lower stem is axially maintained within the choke valve chamber with at least one annular U-ring situated between the at least one top aperture and the at least one plug aperture.

7. The choke valve apparatus of claim 1 wherein the bonnet is selectively fixed with a threaded portion of the choke valve body at a metal-to-metal seal by a wing nut, the metal-to-metal seal preventing the fluid from leaking between the choke valve body and the bonnet when the wing nut is tightened.

8. The choke valve apparatus of claim 1 wherein the bore of the bonnet further including a threaded, annular packing nut through which the upper portion of the lower stem is slidably retained, the bore including a packing nut thread for engaging the packing nut, whereby the annular seal may be accessed and lubricated from outside of the bonnet by removing the packing nut.

9. The choke valve apparatus of claim 1 wherein a yoke assembly is selectively fixed with a top side of the bonnet at a yoke support plate of the bonnet.

10. The choke valve apparatus of claim 1 wherein the yoke assembly includes a yoke having at least one slot therein aligned with the upper and lower stems, the at least one slot adapted for slidably capturing a shoulder bolt therein, the shoulder bolt transversely engaged with the upper and lower stems to prevent rotation of the upper and lower stems by the drive shaft, whereby rotary motion is converted to linear motion.

11. The choke valve apparatus of claim 10 wherein the yoke assembly further includes an outer indicator sleeve fixed with the upper stem and an inner indicator fixed with the yoke assembly and within the indicator sleeve, whereby as the upper stem moves from the raised position to the lowered position the indicator sleeve moves away from the indicator to reveal progressively more of the indicator, the indicator having indicia thereon corresponding to the position of the plug within the seat.

12. The choke valve apparatus of claim 1 wherein the rotational drive mechanism further includes a thrust assembly disposed about the drive shaft that includes at least one thrust bearing to prevent axial movement of the drive shaft while facilitating rotational movement of the drive shaft.

13. The choke valve apparatus of claim 12 wherein the drive shaft terminates at a top end thereof with a nut, whereby a handle wrench or wheel may be used to rotate the nut to move the choke valve apparatus between the closed and open positions.

14. The choke valve apparatus of claim 12 wherein the drive shaft terminates at an actuator coupling, whereby an electrically-driven choke valve actuator engaged with the actuator coupling may be used to remotely move the choke valve apparatus between the closed and open positions.

15. The choke valve apparatus of claim 1 wherein the lower end of the upper stem is selectively fixed with the upper end of the upper portion of the lower stem at a coupler.

16. The choke valve apparatus of claim 1 wherein the choke valve seat is selectively fixed within the choke valve body at a metal-to-metal seal by a treaded arrangement, the metal-to-metal seal preventing the fluid from leaking between the choke valve seat and the choke valve body when the choke valve seat is tightened within the choke valve body.

17. The choke valve apparatus of claim 1, further comprising a breakaway coupler releasably joining the lower end of the upper stem with the upper end of the upper portion of the lower stem, said breakaway coupler releasing the rotational drive mechanism at a preferred torque threshold limit.

18. The choke valve apparatus of claim 17, wherein the breakaway coupler comprises a frictional sleeve fixed to the upper end of the upper portion of the lower stem, said frictional sleeve having a frictional engagement limit corresponding to the preferred torque threshold limit.

* * * * *